(12) United States Patent
Ross

(10) Patent No.: US 10,678,193 B2
(45) Date of Patent: *Jun. 9, 2020

(54) COMPUTER-IMPLEMENTED METHOD AND SYSTEM FOR AUTOMATICALLY MONITORING AND DETERMINING THE STATUS OF ENTIRE PROCESS SECTIONS IN A PROCESS UNIT

(71) Applicant: Bayer Aktiengesellschaft, Leverkusen (DE)

(72) Inventor: Thomas Ross, Cologne (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,134

(22) Filed: Jan. 24, 2019

(65) Prior Publication Data

US 2019/0171168 A1 Jun. 6, 2019

Related U.S. Application Data

(63) Continuation of application No. 15/101,614, filed as application No. PCT/EP2014/076677 on Dec. 5, 2014, now Pat. No. 10,261,480.

(30) Foreign Application Priority Data

Dec. 5, 2013 (EP) .................................. 13195897

(51) Int. Cl.
*G05B 13/02* (2006.01)
*G05B 23/02* (2006.01)
*G05B 19/418* (2006.01)

(52) U.S. Cl.
CPC ... *G05B 13/0265* (2013.01); *G05B 19/41885* (2013.01); *G05B 23/0216* (2013.01); *G05B 23/0254* (2013.01); *G05B 2219/24015* (2013.01); *G05B 2219/33037* (2013.01);
(Continued)

(58) Field of Classification Search
CPC .......... G05B 2219/33037; G05B 2219/33322; G05B 23/0216; G05B 23/0254; G05B 2219/24015; G05B 19/41885; G05B 13/0265; Y02P 90/18; Y02P 90/26; Y02P 90/86

See application file for complete search history.

(56) References Cited

U.S. PATENT DOCUMENTS

| | | | |
|---|---|---|---|
| 6,108,616 A | 8/2000 | Borchers et al. |
| 6,285,966 B1 | 9/2001 | Brown et al. |
| 6,556,939 B1 | 4/2003 | Wegerich |

(Continued)

FOREIGN PATENT DOCUMENTS

| | | |
|---|---|---|
| CN | 1313966 A | 9/2001 |
| CN | 101776862 A | 7/2010 |

(Continued)

OTHER PUBLICATIONS

PCT International Search Report for PCT/EP2014/076677, dated Feb. 19, 2015.

*Primary Examiner* — Abdelmoniem I Elamin
(74) *Attorney, Agent, or Firm* — McBee Moore & Vanik IP, LLC

(57) ABSTRACT

The invention relates to a method and a computer-implemented system for automatically monitoring and determining the status of entire process sections in a process unit in a computer-implemented manner.

3 Claims, 5 Drawing Sheets

(52) U.S. Cl.
CPC ..... *G05B 2219/33322* (2013.01); *Y02P 90/18* (2015.11); *Y02P 90/26* (2015.11); *Y02P 90/86* (2015.11)

(56) References Cited

U.S. PATENT DOCUMENTS

| | | |
|---|---|---|
| 6,643,600 B2 | 11/2003 | Yanosik et al. |
| 6,853,920 B2 | 2/2005 | Hsiung et al. |
| 7,756,678 B2 | 7/2010 | Bonissone et al. |
| 8,620,853 B2 | 12/2013 | Herzog |
| 2009/0300417 A1 | 12/2009 | Bonissone et al. |
| 2011/0191076 A1 | 8/2011 | Maeda et al. |
| 2013/0024415 A1 | 1/2013 | Herzog |

FOREIGN PATENT DOCUMENTS

| | | |
|---|---|---|
| CN | 102112933 A | 6/2011 |
| DE | 102 41 746 A1 | 3/2004 |
| DE | 10 2009 025855 A1 | 12/2009 |
| EP | 0 893 746 A2 | 1/1999 |
| EP | 1 090 333 B1 | 1/2004 |
| EP | 1 267 233 B1 | 11/2006 |
| JP | 2004-531815 A | 10/2004 |
| WO | 02/086726 A1 | 10/2002 |

COMPUTER-IMPLEMENTED METHOD AND SYSTEM FOR AUTOMATICALLY MONITORING AND DETERMINING THE STATUS OF ENTIRE PROCESS SECTIONS IN A PROCESS UNIT

CROSS REFERENCE TO RELATED APPLICATIONS

This application is a Continuation application of U.S. patent application Ser. No. 15/101,614, filed Aug. 18, 2016, now U.S. Pat. No. 10,261,480, which is a National Stage entry of International Application No. PCT/EP2014/076677, filed Dec. 5, 2014, which claims priority to European Patent Application No. 13195897.7, filed Dec. 5, 2013. Each of these applications is incorporated by reference in its entirety.

The invention relates to a method and a computer-implemented system for automatically monitoring and determining the status of entire process sections in a process unit in a computer-implemented manner.

Against the background of an increasingly heterogeneous system landscape and the constantly increasing degree of automation of installations, innovative assistance systems and Plant Asset Management (PAM) solutions are becoming increasingly important for the operator. In this case, the monitoring and diagnosis of apparatuses, devices and automation technology of a process unit are assigned a key role.

A central objective of modern plant asset management is to increase the installation availability and the installation use by monitoring the state of field devices and installation components (asset monitoring).

In many cases, asset status information already exists at the device level. For example, the so-called intelligent field devices have already become largely established in many businesses. Condition monitoring systems are likewise already offered at the level of the more complex machines and apparatuses, for instance pumps or heat exchangers, and are available [Mühlenkamp, S., Geipel-Kern, A.: Plant Asset Management: In der Diagnose mechanischer Assets schlummert ungenutztes Potenzial [Unused potential lies dormant in the diagnosis of mechanical assets], PROCESS, (2011) No. 3, 36-38]. However, the task-related compression of the status information is also absolutely necessary for the user in this case.

In order to monitor and diagnose already simple apparatus clusters and entire installation sections, a multiplicity of items of information, such as measurement and manipulated variables, are already available as standard for process management. However, the users often are not able to fully use the information. In order to obtain indications of creeping deterioration processes in good time here, automated compression and its comparison with the current operating state for the purpose of assessing the asset health with real-time capability are assigned a key role [Ross, T., Ochs, S., Frey, C. W.: Neue Software zur Überwachung "nicht intelligenter" Anlagenteile—Teil 1 [New software for monitoring "non-intelligent" installation parts—part 1], Chemie Technik, (2011) issue 11, pages 18-20]. This is because it is possible to predict and finally derive suitable measures only on the basis of such secure knowledge, for instance in the sense of predictive maintenance, but also production and downtime planning. Reliable asset status information therefore forms the basis for various and different company decisions which are essential to the success of the business.

The problem was therefore to develop a system and a method for monitoring installation parts (process units) which are connected by process engineering, which can be used without considerable engineering and modelling effort on the basis of the existing field instrumentation for the asset monitoring of businesses and presents the user with a reliable monitoring tool which is simple and quick to operate, in which case the asset status information for each process unit is automatically compressed and is displayed in a simple manner in aggregated form. Asset status information beyond the level of the intelligent field devices should also be provided by "non-intelligent" installation parts and installation sections of process engineering businesses. For this purpose, the object was to provide a technical software solution which makes it possible for the setting of the threshold value and therefore the distinction between a good state and deviations therefrom to be automatically determined during the method.

The application covers intelligent field devices which monitor themselves using sensors and/or diagnostic software.

DETAILED DESCRIPTION OF A PREFERRED EMBODIMENT

Figure 1:
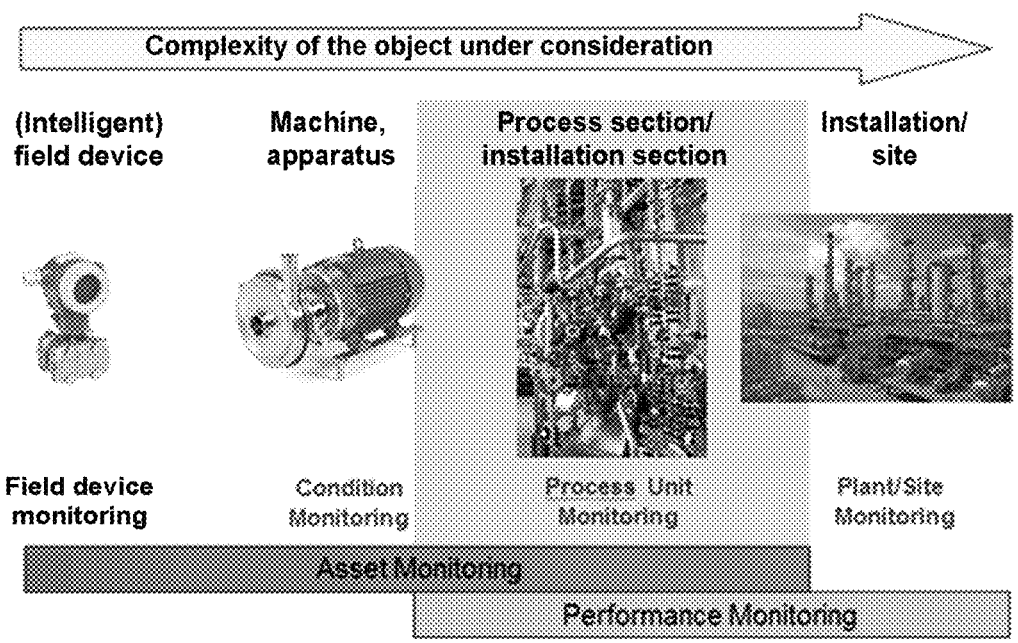
FIG. 1 shows a schematic illustration of plant asset management (PAM), in which case process unit monitoring is combined with condition and performance monitoring.

The monitoring of installation parts which are connected by process engineering was resolved by means of a computer-implemented method for monitoring installation parts which are connected by process engineering and comprise one or more process units, which comprises the following steps:

In step a), M process parameters to be monitored and their measurement range limits are created. The measurement range limits are used to parameterize the model (cf. [Frey, C. W.: Prozessdiagnose und Monitoring feldbusbasierter Automatisierungsanlagen mittels selbstorganisierender Karten und Watershed-Transformation [Process diagnosis and monitoring of field-bus-based automation installations by means of self-organizing maps and watershed transformation], at-Automatisierungstechnik 56 (2008) No. 7, pages 374-380]). The input is usually made via a user interface. The inputs are stored in a module for defining the process unit.

In step b), learning data phases consisting of potential learning vectors are imported into a database module. The learning data phases are usually imported from a process database of a process control system. These learning data phases consist of potential learning vectors each defined by the actual, desired and/or manipulated variable values for the M process parameters from step a) and a time stamp t. The learning data phases from the process database are transmitted via a data interface (OPC, SQL); the imported learning data phases are stored in the database module. The database module is also connected to a model module based on a neural network.

In step c), in the database module, N learning vectors are selected from the learning data phases from b). This selection is typically made by the user via the user interface.

In step d), the selected learning vectors from step c) are automatically transmitted to the model module. These learning vectors are used to create a model based on a neural network in a fully automatic manner using a data-driven algorithm. For this purpose, each learning vector is iteratively assigned to a neuron having a shortest distance from the learning vector until the neurons form a self-organizing neural map (SOM) (cf., in this respect, http://en.wikipedia.org/wiki/Self-organizingmap, Frey, C. W.: Prozessdiagnose und Monitoring feldbusbasierter Automatisierungsanlagen mittels selbstorganisierender Karten und Watershed-Transformation [Process diagnosis and monitoring of field-bus-based automation installations by means of self-organizing maps and watershed transformation], at-Automatisierungstechnik 56 (2008) No. 7, pages 374-380). The model trained in this manner represents the good state (reference) of the installation parts to be monitored.

In step e), the following features of the model are automatically calculated (cf. FIG. 7):
   a deviation error as the distance between each process parameter value of a learning vector and the corresponding process parameter value of the best matching unit assigned to it (=neuron having the shortest distance),
   for each of the N learning vectors, a total deviation error as the sum of the deviation errors of its M process parameters.

This results in a residuum. For this purpose, the deviation errors for all M process parameters of each of the N learning vectors are calculated, that is to say M×N deviations plus N total deviation errors are calculated in a matrix in number form. In step f), the N total deviation errors from step e) are transmitted to a module for analysing the deviation errors. In this module, a minimum and a maximum value of the N total deviation errors are automatically calculated. The minimum and maximum values of the N total deviation errors provide a summarizing simple definition of the good state which can be used to ensure the subsequent monitoring of the installations. It is also advantageous that the total deviation error takes into account the fact that not only one process parameter alone but rather a combination of process parameters possibly describes the actual good state of the process unit. In one preferred embodiment, at least one threshold value is also automatically calculated and set for the total deviation error. In this particular embodiment, the method comprises the following further steps for automatically setting the threshold value:
   the determined range of values for the total deviation errors is used as the basis for a histogram of the total deviation errors. It is subdivided into 10 to 100, preferably 15 to 75, particularly preferably 50, equidistant (value range) segments.

Figure 2:
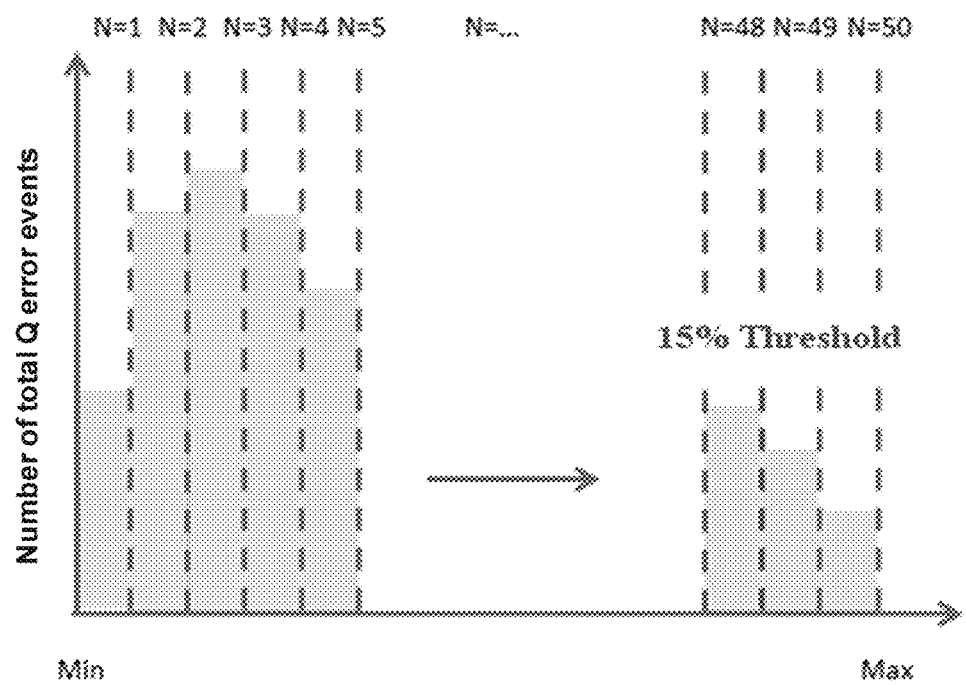
FIG. 2 shows a histogram of the total deviation errors as the event frequency for each segment of the range of values.

The total deviation errors of the learning vectors are automatically sorted into the segments. A base threshold (cf. FIG. 2) is automatically set using the following steps: base threshold=first segment supporting point, for which ≥5 to 15%, preferably ≥15%, of the highest total deviation errors are within the segments starting from the maximum value (cf. FIG. 2). In this case, the further condition that the base threshold must be in the range of the uppermost 7/10 of the segments starting from the maximum value, that is to say must be in the range of the 15th to 50th segment in the case of a division into 50 segments and must be in the range of the 30th to 100th segment in the case of a division into 100 segments, applies to the base threshold. If the base threshold is outside this range, the percentage of ≥5% instead of ≥15% of the highest total deviation errors applies to the automatic adjustment of the base threshold.

In step g), in order to monitor the process units, the M process parameter values monitored online (cf. FIG. 7) are automatically transmitted to the database module at a time t; these form monitoring vectors of the process unit over time. The monitoring vectors are forwarded from the database module to the model module.

In step h), each monitoring vector from step g) is automatically assigned to its best matching units of the neural map (SOM) from step c) in the model module by comparing the process parameter values of the monitoring vector with the process parameter values of each neuron in the neural map and selecting a neuron on the basis of the shortest distance.

In step i), the deviation errors of each process parameter value of the monitoring vector in comparison with the process parameter value of the best matching unit assigned to it are automatically calculated and the total deviation error of the monitoring vector is calculated. This calculation is carried out in the module for analysing the deviation errors.

In step j), the total deviation errors of each monitoring vector in comparison with the calculated minimum and maximum values of the total deviation errors, preferably in comparison with the base threshold, particularly preferably in comparison with the base threshold multiplied by a tolerance range in the form of an integer positive factor of usually 2-4, preferably 3 according to experience, are displayed via the user interface.

For clarity, important terms of the description are defined as follows:
A process unit is an installation part or a process section which is connected by process engineering and can be monitored using the invention on the basis of the existing sensors/actuators, that is to say process parameters selected by the process expert. A plurality of process units can be defined for monitoring in the solution according to the invention.
Learning data phases are phases which can be selected in full or in sections for the purpose of training the model based on a neural network and consist of time stamps and accordingly learning vectors of the dimension (M×1).
A monitoring phase is a phase in which a process unit is monitored and consists of a number of monitoring vectors.
The process parameters have been or are sampled in a phase—learning phase or monitoring phase—at discrete times (=time stamps). At a sampling rate of 1/min, one vector per minute is present in the process data archive (=process database) after monitoring.

A learning vector or monitoring vector is defined by the values of the M process parameters input in step a) and a time stamp t. In the case of M process parameters, it has the dimension (M×1), that is to say M parameter values. The values of the process parameters are usually the monitored actual values of the process units. In the case of process control, the desired values (also called reference variable) and/or manipulated variable values (also called manipulated variable) of the process parameters can also be included. It is also possible to combine these values in order to define a learning vector. A monitoring vector is typically defined by its M actual values for a time stamp t.

Deviation errors, also called quantization errors or Q errors, describe the degree of adaptation of the model to the learning vectors or the degree of adaptation of the monitoring vector to the model. The deviation error is the clearance between the best matching unit (BMU) calculated by the algorithm and the presented learning or monitoring vector. M deviation errors are calculated for each learning vector or monitoring vector of the dimension (M×1). In other words, the parameter values of each learning vector are compared with the parameter values of the best matching unit and the Euclidean distance between these parameters is calculated.

The total deviation error, also called total quantization error, total Q error or total error, corresponds to the sum of all deviation errors of a vector.

The residuum of one or more learning data phases with a total of N time stamps and learning vectors of the dimension (M×1) consists of the matrix of M×N deviation errors. The residuum can be used as a quality feature for the model. In the present invention, the N total deviation errors are also included in the residuum matrix.

BMU, best matching unit or best matching neuron: if a learning or monitoring vector is presented to the neural network, there is always a "winner neuron" (for example minimum Euclidean distance) which best matches the presented vector, that is to say the neuron with the lowest deviation error. This is called the best matching unit or BMU and is defined by its M process parameter values. In other words, a model vector defined by its M parameters is calculated. In order to calculate the best matching unit of a self-organizing neural map, reference is made to the prior art, for example http://en.wikipedia.org/wiki/Self-organizing map and Frey et al. [Frey, C. W.: Prozessdiagnose und Monitoring feldbusbasierter Automatisierungsanlagen mittels selbstorganisierender Karten und Watershed-Transformation [Process diagnosis and monitoring of field-bus-based automation installations by means of self-organizing maps and watershed transformation], at-Automatisierungstechnik 56 (2008) No. 7, pages 374-380].

Figure 7:
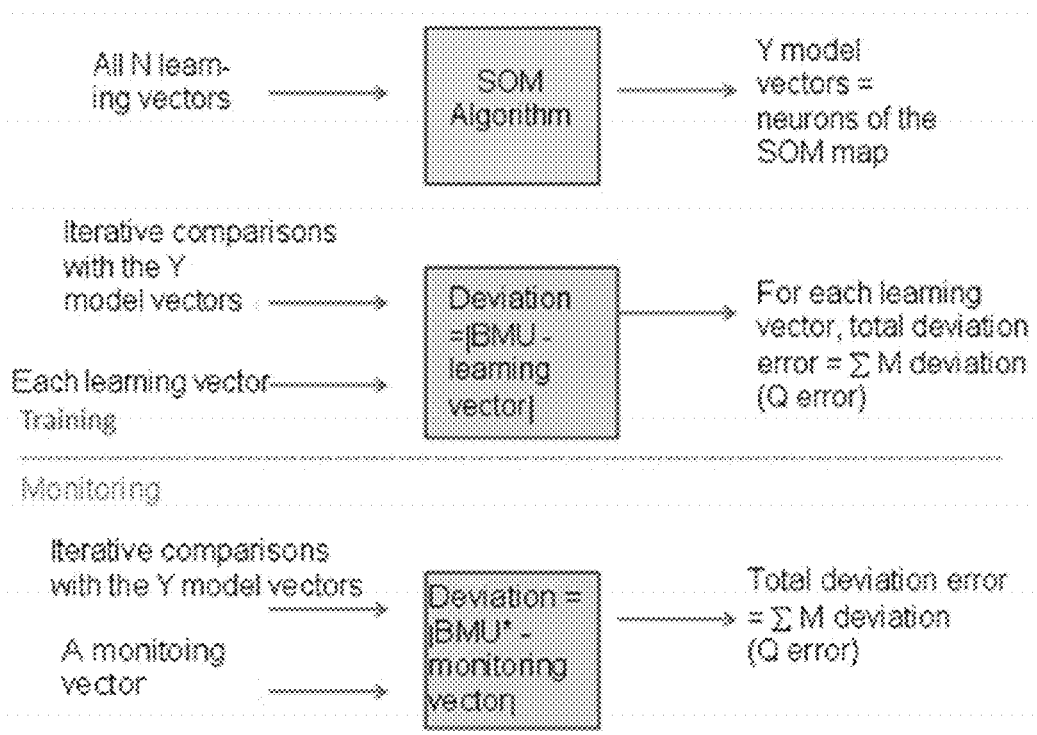
FIG. 7 shows a schematic illustration of the training and assignment phase.

Like most neural networks, the neural maps operate in two phases: training (=learning phase) and assignment (=mapping/application phase). Training forms the neural map with the aid of learning vectors, in which case mapping is the automatic assignment of a new vector, for example a monitoring vector. These phases are schematically illustrated in FIG. 7.

The method can usually be carried out on a somewhat more powerful commercially available computer and by means of software installed on this computer. No particular requirements are imposed on the hardware. The solution according to the invention does not require any considerable engineering and modelling effort and can be used on the basis of the existing field instrumentation.

Figure 5:
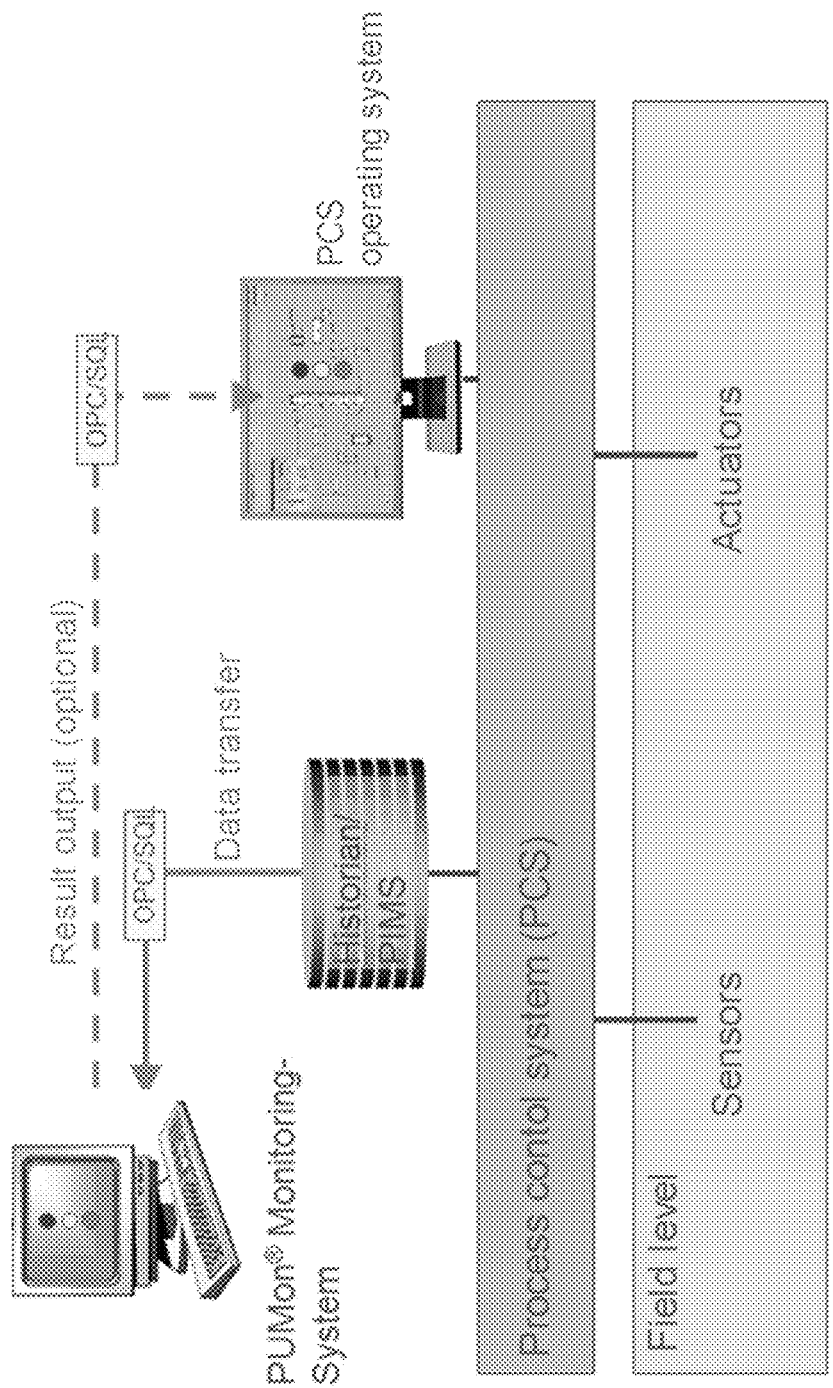
FIG. 5 shows a schematic illustration of the integration of the system in the installation landscape.

In order to connect the computer including the software to the process monitoring, the process unit monitor usually has OPC, ODBC and SQL interfaces. In the case of the OPC interface, the historical data from step b) or c) are acquired from the database of the process control system via OPC-HDA and real-time data (=monitoring vectors) from step g) are acquired from the database of the process control system via OPC-DA (FIG. 5). The status information for each process unit is additionally usually made available to the outside using the internal OPC-DA server.

In step a), conventional associated installation parts (process units) or installation sections (process sections) to be monitored are defined. These installation parts or process sections are characterized by their M process parameters to be monitored. Examples of installation parts are a distillation column, a heat exchanger/pump combination, a dryer, a screw extruder or a boiler together with connected peripherals such as pipelines and instrumentation. In this case, the process expert stipulates the sensors/actuators required for monitoring and the associated measurement ranges. He determines which process parameters—pressures, temperatures, flow rates, etc.—are included in the monitoring and which are not. All actual, desired and/or manipulated variable values of the functional monitoring unit under consideration are usually relevant. The software assists with the configuration by virtue of process parameters being able to be easily selected and deselected. In one particular embodiment, additionally determined process parameters are declared to be "compulsory" and/or "key variables".

Compulsory process parameters are process parameters which are required for the monitoring. If a compulsory process parameter is absent in the monitoring, the latter is usually automatically deactivated and the process unit status "traffic light" changes from "red", "yellow" or "green" to "grey". Such a change informs the user of the failure of sensors/actuators in the process unit.

Key variables are compulsory parameters which also must not leave the previously defined range of values. For this purpose, the minimum and/or maximum value of each learning data phase is preferably extended up and down by an adjustably high percentage as a tolerance range. The model is typically trained only in this previously defined and extended range of values. If the monitoring vector leaves the ranges of values extended in this manner, the monitoring of the process unit together with the status traffic light is likewise deactivated and "grey". In the case of a load variable (feed), it is therefore possible to prevent the monitoring from being applied to untrained process states. The following applies: key variables are automatically also compulsory parameters. This is not the case the other way round.

In step b), the user imports potential learning data phases (acquisition data). These are automatically stored in the internal database (=database module) for subsequent assessment.

In step c), the process expert can visualize the potential learning data phases and can then select learning or reference data records (selected learning data phases) therefrom in which the installation was run in the good state according to the requirements. Learning or reference data records for a plurality of products or load states are preferably input to the model. For this purpose, a load or product parameter which marks the different installation states (product and/or load states) is included in step a). This parameter is usually concomitantly trained as an additional "process parameter".

In other words, not only data relating to the sensors/actuators but preferably also data relating to product and/or load states can be used as process parameters. This reduces the effort for creating models and monitoring.

As an alternative to import by the user and selection via the user interface, the process expert can carry out a detailed definition of the good state in step a), which then allows learning data phases to be automatically imported (step b) and/or selected (step c).

In step d), the model of the good state which is based on a neural network is calculated. The model based on a neural network is usually trained according to the learning rules of Frey et al. [Frey, C. W.: Prozessdiagnose und Monitoring feldbusbasierter Automatisierungsanlagen mittels selbstorganisierender Karten und Watershed-Transformation [Process diagnosis and monitoring of field-bus-based automation installations by means of self-organizing maps and watershed transformation], at-Automatisierungstechnik 56 (2008) No. 7, pages 374-380], the content of which is introduced here by reference. The underlying algorithm is based on so-called self-organizing maps (SOM) and the data-driven model creation uses process information (from the connected actuators/sensors), for example temperatures, flow rates, pressures, motor currents, etc., from the installation part to be monitored or the installation section to be monitored. The mathematical core algorithm for monitoring installation parts has already been previously successfully used within the scope of a diagnostic concept for field-bus-based automation installations [Ross, T., Hedler, C. S., Frey, C. W.: Neue Softwarewerkzeug zur Überwachung "nicht intelligenter" Anlagenteile und Teilanlagen [New software tool for monitoring "non-intelligent" installation parts and installation sections] In: AUTOMATION 2012 13. Branchentreff der Mess-und Automatisierungstechnik. VDI-Berichte 2171. Baden-Baden, 2012, pages 231-235, ISBN 978-3-18-092171-61.

Thanks to the use of a neural network, the tool could be designed in such a manner that the user can generate the monitoring models single-handedly—at the touch of a button as it were—within one minute and can then immediately use them for monitoring. For this purpose, the process expert selects the necessary process information in the form of so-called learning or else reference data records. This data-driven approach differs fundamentally from the procedure in analytically model-based methods. These require complex modelling and a lot of experience of the developers. If the process changes, for example because structural or process-optimizing measures were carried out, the analytical model must also be accordingly adapted. The result is additional modelling effort. In contrast, in the data-driven approach presented here, there is a need only for the model to be adapted again by the user. The model based on a neural network can be adapted by means of training if the input changes.

In summary, the trained model represents the good state (reference) of the process section to be monitored. Deviations from the model are translated flexibly, and in one preferred embodiment of the invention automatically, into threshold values, at least in one base threshold particularly preferably multiplied by the tolerance range in the form of an integer positive factor of usually 2-4, preferably 3 according to experience.

When calculating the base threshold, the number of segments is set on the basis of empirical values and is usually 10 to 100, preferably 15 to 75, particularly preferably 50. The resolution of the range of values must be sufficiently high to be able to precisely set the threshold. This is the case for at least 50 segments. When defining the number of segments, however, the user should be careful to ensure that the resolution does not become too high, that is to say remains adapted to the problem. Otherwise, the result may be numerous unoccupied segments, which results in an unnecessarily high amount of computing. When sorting the learning vectors into the segments using their total deviation errors, the situation may occur, in rare cases, that more than 85% of the events are in the 1st to 15th segment and the remaining events are distributed among segments 16-50. In this case, the percentage of ≥15% of the learning data vectors with the total deviation error ≥base threshold would be set too low. Therefore, the percentage of the learning data vectors with the total deviation error ≥base threshold is usually set after ≥5% of the events with the highest values. The calculated base threshold is particularly preferably multiplied by a tolerance range in the form of an integer positive factor of usually 2-4, preferably 3 according to experience.

The deviation errors can optionally also be transmitted to the module for analysing the deviation errors and a base threshold can be determined for each process parameter. A further output of the method is then an assignment of the parameter of each monitoring vector under consideration in comparison with a pre-parameterized threshold (base threshold times the positive integer factor) of the parameter under consideration.

If the system is used to monitor a process unit over a relatively long time, the number of learning data records which can be used increases. It is possibly advantageous to repeat the training of the neural network in order to take into account new learning sets in the model of the good state. The model updating should ideally be integrated in the daily business as part of a common PAM strategy. Thanks to the simple operation and the small number of working steps, the effort is reasonable. In addition, generally only a few minutes are needed to update a model.

Figure 3:
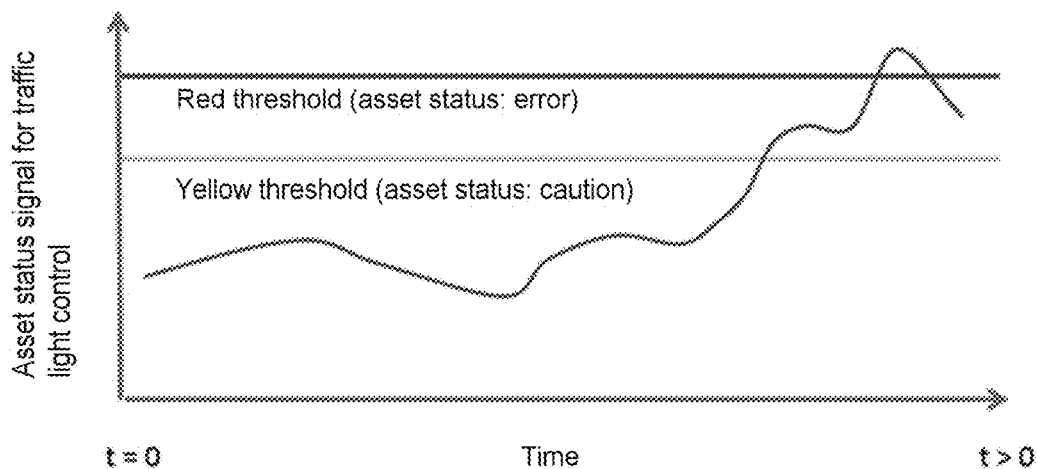
FIG. 3 shows threshold values for monitoring and analysing the asset status.
Figure 4:
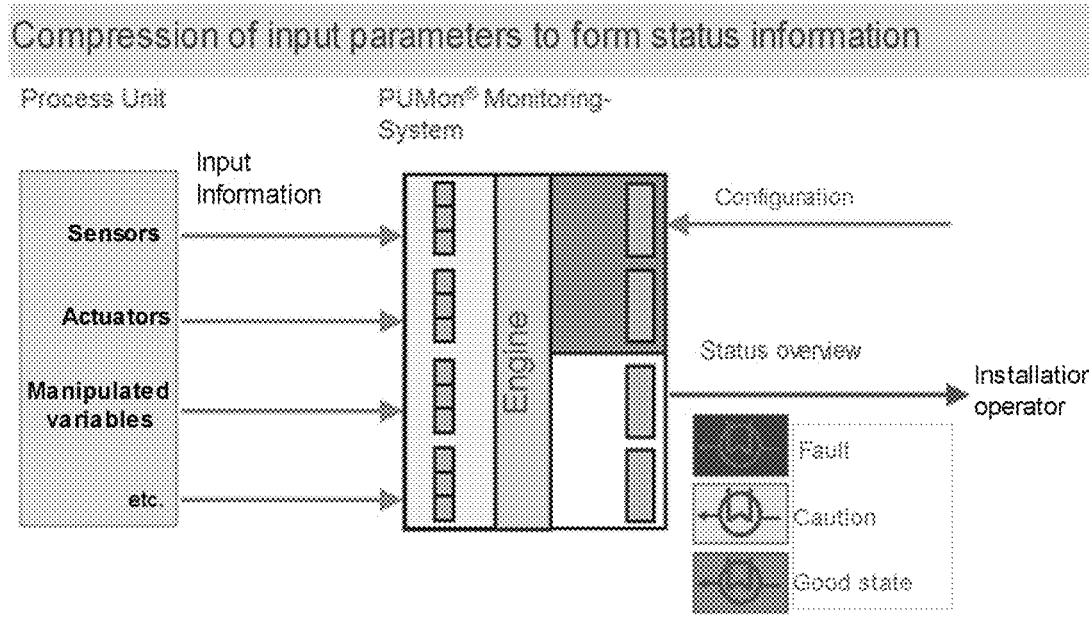
FIG. 4 shows a schematic illustration of the architecture of the system according to the invention with interfaces.

For better operability, the output is preferably represented in the form of a traffic light system, as in FIG. 3. For the red threshold, the determined base threshold is usually multiplied, as standard, by the additional positive integer factor as the setting parameter (value=3), but the yellow threshold is adjustably set to 75% of the level of the red threshold as standard. The setting parameter controls the sensitivity of error detection (that is to say whether already small or only large deviations from the trained model result in a red traffic light) during the subsequent monitoring of the installation part or installation section and can optionally be changed. The yellow threshold can likewise be optionally changed as a percentage of the red threshold.

According to the traffic light scheme (green=okay, yellow=caution, red=error), the yellow threshold and a red threshold are set, allowing the user to be informed (cf. FIG. 1) of the state of health (asset status) of the installation part or installation section in the case of monitoring (real time) or analysis (offline).

The placement of the traffic lights for visualizing the process unit status on the basis of the calculated base threshold can preferably be adapted by the user via the user interface. In operating images, a traffic light (okay, increased attention, error) is typically visualized for each process unit in the associated operating image. Possible deviations can subsequently be recorded in this manner in real time by the installation operators. In the case of "yellow" or "red", the process expert needs to be informed for the purpose of detailed analysis.

Figure 6:
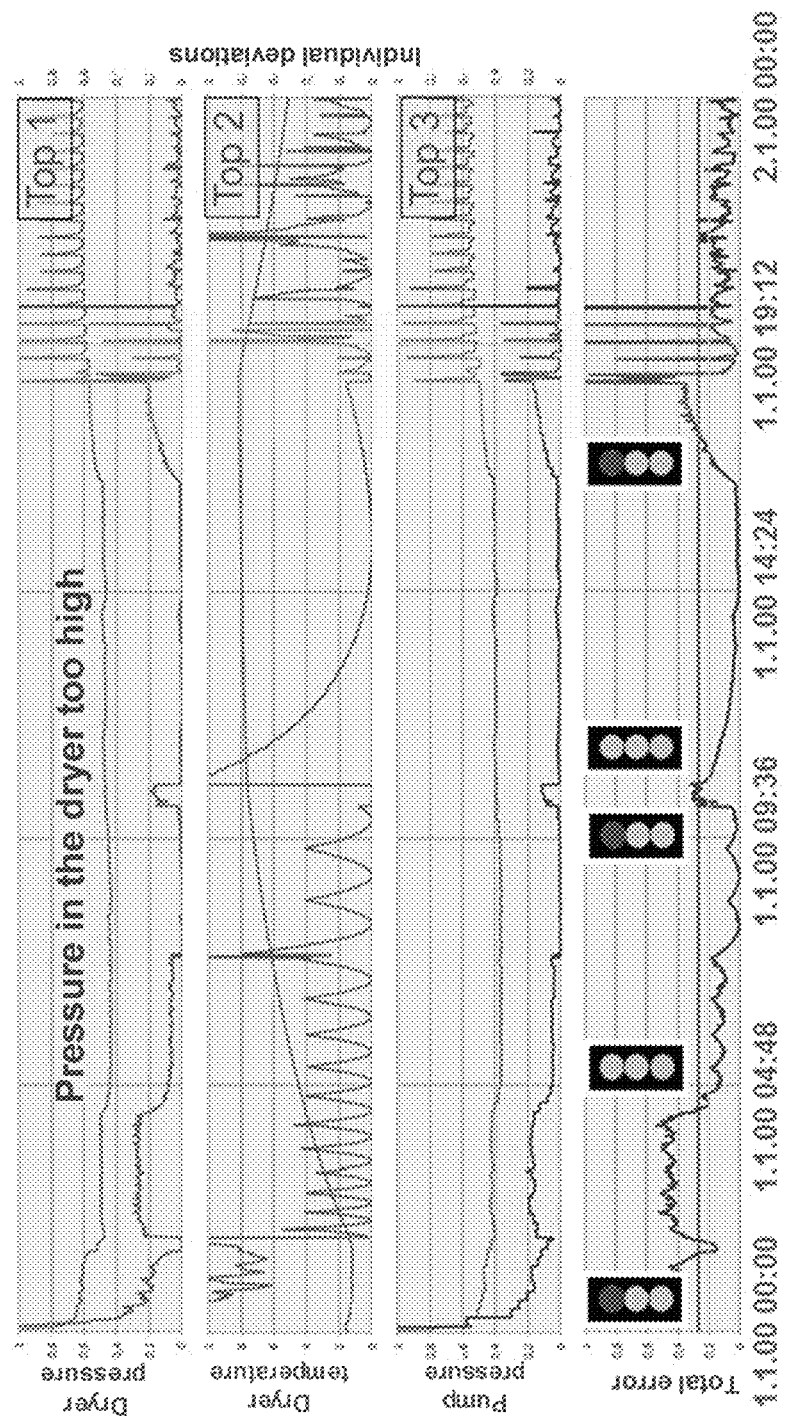
FIG. 6 shows a graphical illustration of parameter deviations assigned according to size (top 10 illustration, in which case only the first three parameters are displayed for clarity).

For a better overview of the deviating process parameters, the process parameter deviations from one of usually a plurality of monitoring vectors can be displayed in a graphically assigned manner in descending order according to size (for example in the form of a top 10) (FIG. 6).

In addition, its percentage of the total deviation error can be additionally calculated and graphically displayed for each process parameter.

The application also relates to a computer program or software for carrying out the computer-implemented method.

The invention also relates to a computer system for monitoring installation parts which are connected by process engineering and comprise one or more process units, comprising the following modules:
  a) a user interface for defining i) M process parameters to be monitored and ii) input of the measurement range limits of the M process parameters of one or more process units to be monitored,
  b) a module for defining the process unit for storing the inputs i) and ii), connected to the user interface,
  c) a database module for importing and storing learning data phases, learning vectors and monitoring vectors via a data interface, wherein the database module is connected to the module for defining the process unit and to the user interface,
  d) a model module which is based on a neural network and is intended to train a model based on a neural network in a fully automatic manner by automatically calculating:
    best matching units and a self-organizing neural map of the best matching units,
    a deviation error as the distance between each process parameter value of a learning vector and the corresponding process parameter value of the best matching unit assigned to it,
    for each of the N learning vectors, a total deviation error as the sum of the deviation errors of its M process parameters,
    and to assign a monitoring vector to one of the best matching units of the self-organizing neural map and calculate:
    a deviation error as the distance between each process parameter value of the monitoring vector and the corresponding process parameter value of the best matching unit assigned to it,
    for each of the monitoring vectors, a total deviation error as the sum of the deviation errors of its M process parameters,
  e) a module for analysing the deviation errors by automatically determining a range of the calculated total deviation errors, sorting the learning and monitoring vectors using their total deviation errors in the determined range, wherein the module for analysing the deviation errors is connected to the model module, and wherein the module for analysing the deviation errors is connected to the user interface for displaying the sorting of the monitoring vectors in the range of the calculated total deviation errors.

The system according to the invention is particularly advantageous for all installation components which are not equipped with self-diagnosis as standard, for instance boilers and pipelines, heat exchangers or distillation columns [Hotop, R., Ochs, S., Ross, T.: Überwachung von Anlagenteilen [Monitoring of installation parts], atp edition, 06/2010]. Following the basic intention of the system according to the invention, the process parameters of a process unit are not considered alone in isolation. Rather, the system correlates all parameter sets with one another and in this manner detects the characteristic interaction of the individual components of the functional unit to be monitored. In this process, it learns and checks the dependencies thereof and derives summary status statements therefrom, for instance in the sense of a traffic light scheme in which a distinction is made between the good state ("green"), a looming need for action ("yellow") and a malfunction ("red").

It has also been found that the process unit monitor can also be gainfully used to monitor asset combinations which are susceptible to faults and for which individual monitoring solutions also already exist on the market in principle, on the one hand in order to cover particular types of installation problems which have previously not been detected or else, on the other hand in order to uncover cause-effect relationships in the deterioration processes, for example if installation problems inside an installation section propagate from asset to asset.

On the other hand, image 1 illustrates that process unit monitoring, correctly understood, already contains some elements of conventional process management (performance monitoring), but not in the sense of process management according to key performance indicators in order to find a more optimum running state, but rather in the sense of targeted monitoring of particular subprocesses in order to derive information relating to diminishing asset performance which cannot be directly attributed to impairment of the asset health, for instance as a result of leaving the optimum running of the installation.

The invention claimed is:

1. A computer-implemented method for monitoring installation parts which are connected by process engineering and comprise one or more process units, wherein the computer of the computer-implemented process includes at least one non-transitory computer-readable medium, the at least one computer-readable program comprising a program which, when executed by the computer causes the computer to execute the method for monitoring installation parts having the following steps:
  in step a), M process parameters of each of the one or more process units to be monitored and their measurement range limits are input to a module for defining the process unit,
  in step b), learning data phases consisting of one or more learning vectors in which the installation was run in a good state according to requirements are imported to a database module, wherein each of the one or more learning vectors comprise one of more of the M inputted process parameters,
  in step c), the learning vectors are transmitted from the database module to a model module connected to the latter; wherein in the model module, a model based on a neural network is generated by assigning each learning vector to a best matching unit defined by its M process parameters identified by adapting the best matching units to the learning vectors in a self-organizing neural map made of neurons, said neurons being the best matching units assigned to the learning vectors,
  in step d), the following features of the model are automatically calculated:
    for each of the one or more learning vectors, a deviation error as a distance between each inputted process parameter value of the one or more learning vectors and the corresponding process parameter value of the best matching unit assigned to it, for each of the one or more learning vectors, a total deviation error as the sum of the deviation errors of its M inputted process parameters from the assigned best matching unit of each of the one or more learning vectors, in step e), the total deviation error for each learning vector from step d) is transmitted to a module for analysing the deviation errors and a minimum and a maximum value of the calculated total deviation errors are automatically determined there, a range between the minimum and maximum values of the calculated total deviation errors is subdivided into 10 to 100 equidistant segments, the learning vectors are sorted into the segments using their total deviation errors, and at least one threshold for the total deviation error is automatically set using the following steps, threshold is equal to first segment supporting point, for which greater than 5 to 15% of the highest total deviation errors are within segments starting from the maximum value, and the threshold is in the range of the uppermost 7/10 of the segments starting from the maximum value, in step g f), to monitor the process units, the processing M process parameters monitored online are automatically transmitted to the database module, as a monitoring vector of the process unit over time, at a time stamp t, and the monitoring vector is transmitted to the model module, in step g), each monitoring vector from step e) is automatically assigned to the best matching units of the self-organizing neural map (SOM) from step c e) in the model module by comparing the processing parameter values of the monitoring vectors with the process parameter values of each neuron in the neural map and making a selection of the neuron which is the best matching unit to the monitoring vector on the basis of the neuron having a shortest distance from each of the monitoring vectors, in step I h), the deviation errors are calculated and the total deviation errors of the monitoring vector are calculated as the sum of the deviation errors of its processing M process parameters, and, in step i), the total deviation error of the monitoring vector is transmitted to the module for analysing the deviation errors and is compared with the minimum and maximum values of the calculated N total deviation errors of the learning vectors, with the segments and/or with the threshold of step e) and a result of the comparison is displayed via the user interface.

2. The computer-implemented method according to claim 1, wherein the calculated threshold is multiplied by a tolerance range in the form of an integer positive factor of usually 2-4.

3. A computer system for monitoring installation parts which are connected by process engineering and comprise one or more process units, the computer system comprising the following modules:

a) a user interface for defining i) M process parameters to be monitored and ii) input of the measurement range limits of the M process parameters of one or more process units to be monitored, b) a module for defining the process unit for storing the inputs i) and ii), connected to the user interface, c) a database module for importing and storing learning data phases, learning vectors and monitoring vectors via a data interface, wherein the database module is connected to the module for defining the process unit and to the user interface, d) a model module which is configured:

to train a model based on a neural network in a fully automatic manner in a self-organizing neural map, to automatically calculate:

a deviation error as a distance between each process parameter value of a learning vector and the corresponding process parameter value of the best matching unit assigned to it, for each of the learning vectors, a total deviation error as a sum of the deviation errors of its M process parameters, to assign a monitoring vector to one of the best matching units of the self-organizing neural map and calculate:

a deviation error as the distance between each process parameter value of the monitoring vector and the corresponding process parameter value of the best matching unit assigned to it, for the monitoring vectors, a total deviation error as the sum of the deviation errors of its M process parameters, e) a module for analysing the deviation errors configured for automatically determining a range of the calculated total deviation errors for the learning vectors, sorting the learning and monitoring vectors using their total deviation errors in the range, subdividing the range into 10 to 100 equidistant segments, sorting the learning vectors into the segments using their total deviation errors, and setting automatically at least one threshold for the total deviation error using the following steps, threshold is equal to first segment supporting point, for which greater than 5 to 15% of the highest total deviation errors are within segments starting from the maximum value, and the threshold is in the range of the uppermost 7/10 of the segments starting from the maximum value, wherein the module for analysing the deviation errors is connected to the model module, and wherein the module for analysing the deviation errors is connected to the user interface for displaying the sorting of the monitoring vectors in the range of the calculated total deviation errors wherein the computer system includes at least one non-transitory computer-readable medium, the computer-readable medium comprising a program which, when executed by a computer in the computer system operates the user interface, the module for defining the process unit, the database module, the model module, and the module for analysing the deviation errors.

* * * * *